United States Patent
Ichise et al.

(10) Patent No.: US 8,408,883 B2
(45) Date of Patent: Apr. 2, 2013

(54) VEHICLE-AIR-CONDITIONER ELECTRIC COMPRESSOR

(75) Inventors: Yuki Ichise, Aichi (JP); Takayuki Watanabe, Aichi (JP); Takashi Nakagami, Aichi (JP); Koji Nakano, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 733 days.

(21) Appl. No.: 12/442,844

(22) PCT Filed: Sep. 25, 2008

(86) PCT No.: PCT/JP2008/067234
§ 371 (c)(1),
(2), (4) Date: Mar. 25, 2009

(87) PCT Pub. No.: WO2009/041461
PCT Pub. Date: Apr. 2, 2009

(65) Prior Publication Data
US 2010/0284838 A1    Nov. 11, 2010

(30) Foreign Application Priority Data
Sep. 28, 2007  (JP) .................................. 2007-255332

(51) Int. Cl.
*F04B 39/06*    (2006.01)
(52) U.S. Cl. ........................ 417/366; 417/410.1; 417/411
(58) Field of Classification Search ............... 417/410.1, 417/411, 366
See application file for complete search history.

(56) References Cited

U.S. PATENT DOCUMENTS

| 2003/0200761 | A1 | 10/2003 | Funahashi et al. | |
| 2004/0222767 | A1* | 11/2004 | Ohkouchi et al. | 318/801 |
| 2005/0011213 | A1 | 1/2005 | Shindo et al. | |
| 2005/0092534 | A1* | 5/2005 | Hobmeyr et al. | 180/65.3 |

(Continued)

FOREIGN PATENT DOCUMENTS

| JP | 5-39164 U | 5/1993 |
| JP | 2001-887 A | 1/2001 |

(Continued)

OTHER PUBLICATIONS

International Search Report of PCT/JP2008/067234, have a mailing date of Dec. 22, 2008.

(Continued)

*Primary Examiner* — Joseph L Williams
(74) *Attorney, Agent, or Firm* — Westerman, Hattori, Daniels & Adrian, LLP (57) ABSTRACT

An inverter-integrated vehicle-air-conditioner electric compressor capable of eliminating malfunctions or the like due to electromagnetic noise interference and improving the reliability is provided. In a vehicle-air-conditioner electric compressor with which an inverter unit is integrated, lead-out positions of low-voltage cables and connectors for supplying a low voltage from a low-voltage power supply to a circuit on a low-voltage ground LV are provided either in a side surface opposite to a mounting position of high-voltage components and high-voltage cables for supplying a high voltage from a high-voltage power supply to a power system circuit on a high-voltage system ground HV; or at an end farthest away from the mounting position of the high-voltage cables and the high-voltage components in an adjacent side surface or the same side surface.

6 Claims, 6 Drawing Sheets

U.S. PATENT DOCUMENTS

| | | |
|---|---|---|
| 2005/0223727 A1 | 10/2005 | Funahashi et al. |
| 2006/0033552 A1 | 2/2006 | Ishikawa et al. |
| 2006/0064998 A1 | 3/2006 | Funahashi et al. |

FOREIGN PATENT DOCUMENTS

| | | | |
|---|---|---|---|
| JP | 2003-324903 A | 11/2003 | |
| JP | 2004-162618 A | 6/2004 | |
| JP | 2005-36753 A | 2/2005 | |
| JP | 2006-54933 A | 2/2006 | |
| JP | 3760887 B2 | 3/2006 | |
| JP | 2006-233820 A | 9/2006 | |
| JP | 2007-113486 A | 5/2007 | |

OTHER PUBLICATIONS

Decision to Grant a Patent dated Dec. 4, 2012, issued in corresponding Japanese Patent Application No. 2007-255332 (3 pages). Statement of Relevance—"The Decision to Grant a Patent has been received".

* cited by examiner

VEHICLE-AIR-CONDITIONER ELECTRIC COMPRESSOR

TECHNICAL FIELD

The present invention relates to a vehicle-air-conditioner electric compressor suitably used as a vehicle-air-conditioner compressor, formed of an inverter unit integrated with a housing accommodating an electric motor and a compression mechanism.

BACKGROUND ART

In recent years, various inverter-integrated electric compressors configured to be integrated with inverter units have been proposed as compressors for air conditioners to be mounted on vehicles. Such an inverter-integrated vehicle-air-conditioner electric compressor has an inverter accommodating portion (inverter box), which accommodates an inverter unit for converting direct-current power supplied from a high-voltage power supply into three-phase alternating-current power to supply the electric motor with the power, integrated with the periphery of a housing accommodating an electric motor and a compression mechanism, and is configured to change the rotational speed of the electric compressor according to the air-conditioning load (for example, refer to Patent Documents 1 to 3).

Such an inverter unit has a high-voltage cable, which leads to a high-voltage power supply for driving the electric motor, connected thereto and high-voltage component such as a capacitor or an inductor provided for the power supply line. The inverter unit also has a low-voltage circuit and component for control and communication, in order to control the inverter unit. The inverter unit and an electric system for control and communication are configured to be communicable while being isolated by a photocoupler or the like.

Patent Document 1: Japanese Unexamined Patent Application, Publication No. 2006-233820

Patent Document 2: Japanese Unexamined Patent Application, Publication No. 2007-113486

Patent Document 3: The publication of Japanese Patent No. 3760887

DISCLOSURE OF INVENTION

In the above-described known inverter unit, because an earth (ground or GND) is shared between the high-voltage system for driving the electric motor and the low-voltage system for control and communication, short-circuiting of the high-voltage circuit causes failure of the inverter unit. Thus, an inverter unit configured to supply the low-voltage system for control and communication with a low voltage from a low-voltage power supply provided separately from the high-voltage power supply, and in which grounds for each system are insulated is proposed.

One problem, however, is that, in either case, a close arrangement of the component of the high-voltage system and the component and circuit of the low-voltage system allows electromagnetic noise to propagate from the high-voltage system to the low-voltage system, and the electromagnetic noise interference can cause malfunction of the inverter unit.

The present invention has been made in view of this situation, and an object thereof is to provide an inverter-integrated vehicle-air-conditioner electric compressor capable of eliminating malfunctions or the like due to electromagnetic noise interference and improving reliability.

To overcome the above-described problem, a vehicle-air-conditioner electric compressor of the present invention employs the following solutions.

A vehicle-air-conditioner electric compressor according to the present invention is a vehicle-air-conditioner electric compressor in which an inverter unit is integrated with a housing accommodating an electric motor and a compression mechanism, the inverter unit being configured such that a high-voltage ground circuit area for driving the electric motor and a low-voltage ground circuit area for control and communication are isolated from each other. A lead-out position of a low-voltage cable and a connector for supplying a low voltage from a low-voltage power supply to the low-voltage ground circuit is provided either in a side surface opposite to a mounting position of a high-voltage component and a high-voltage cable for supplying a high voltage from a high-voltage power supply to a power system circuit on the high-voltage ground; or at an end farthest away from the mounting position of the high-voltage cable and the high-voltage component in an adjacent side surface or the same side surface.

According to the present invention, because the lead-out position of the low-voltage cable and the connector is provided either in the side surface opposite to the mounting position of the high-voltage component and the high-voltage cable for supplying a high voltage; or at an end farthest away from the mounting position of the high-voltage cable and the high-voltage component in an adjacent side surface or the same side surface, the high-voltage cable and the high-voltage component, and the low-voltage cable and the connector can be sufficiently separated from each other. This can suppress propagation of electromagnetic noise from the high-voltage system to the low-voltage system and eliminate malfunctions or the like due to electromagnetic noise interference in the inverter unit. Thus, it is possible to improve the reliability of the vehicle-air-conditioner electric compressor.

The vehicle-air-conditioner electric compressor of the present invention may be configured such that, in the above-described vehicle-air-conditioner electric compressor, the inverter unit is accommodated in a substantially square-shaped inverter box integrated with a side where the electric motor is accommodated in the housing, and the high-voltage ground circuit area and the low-voltage ground circuit area are provided such that they each border at least two adjacent side surfaces of the inverter box.

In this configuration, because the high-voltage ground circuit area and the low-voltage ground circuit area are provided such that they each border at least two adjacent side surfaces of the substantially square-shaped inverter box accommodating the inverter unit, the lead-out position of the high-voltage cable and the lead-out position of the low-voltage cable and the connector can each be provided at a suitable position selected from two or more side surfaces. Accordingly, it is possible to flexibly respond to a change in the mounting condition when mounted on a vehicle, and the design flexibility can be increased.

The vehicle-air-conditioner electric compressor of the present invention may be configured such that, in any one of the above-described vehicle-air-conditioner electric compressors, a refrigerant circulation path, which takes low-pressure refrigerant gas into the housing from a refrigerant suction port provided at one end at the side where the electric motor is accommodated, which allows the refrigerant gas to flow around the electric motor towards the other end in a motor axis direction, which allows the compression mechanism to take the refrigerant gas therein to be compressed, and which sends out the refrigerant gas from one end at the side where the compression mechanism is provided, is formed in the housing, and the high-voltage ground circuit area is disposed at the side where the refrigerant suction port is provided with respect to the refrigerant circulation path.

In this configuration, because the high-voltage ground circuit area is disposed at the side where the refrigerant suction port of the refrigerant circulation path is provided with respect to the circulation path of the refrigerant flowing in the housing, the high-voltage ground circuit area, on which the power board having the high-voltage component and switching elements, such as IGBTs, that generate a large amount of heat is disposed, can be efficiently cooled with the refrigerant just after being taken into the housing from the refrigerant suction port, which is at the lowest temperature. Thus, it is possible to improve the heat-resistance reliability of the inverter unit.

The vehicle-air-conditioner electric compressor of the present invention may be configured such that, in the above-described vehicle-air-conditioner electric compressor, the high-voltage ground circuit area is disposed upstream in a flow direction of the refrigerant flowing in the refrigerant circulation path, the low-voltage ground circuit area is disposed downstream thereof, and the compression mechanism is disposed downstream of these circuit areas.

In this configuration, because the high-voltage ground circuit area is disposed upstream of the low-voltage ground circuit area in the flow direction of the refrigerant flowing in the refrigerant circulation path, and the compression mechanism is disposed downstream of these circuit areas, the high-voltage ground circuit area, on which the component that generates a large amount of heat is disposed, can be cooled with the refrigerant gas taken in through the refrigerant suction port, which is at the lowest temperature, in preference to the low-voltage ground circuit area. Accordingly, it is possible to further improve the heat-resistance reliability of the inverter unit.

The vehicle-air-conditioner electric compressor of the present invention may be configured such that, in the above-described vehicle-air-conditioner electric compressor, the high-voltage ground circuit area and the low-voltage ground circuit area are disposed parallel to each other in the flow direction of the refrigerant flowing in the refrigerant circulation path, and the compression mechanism is disposed downstream of these circuit areas.

In this configuration, because the high-voltage ground circuit area and the low-voltage ground circuit area are disposed parallel to each other in the flow direction of the refrigerant flowing in the refrigerant circulation path, and the compression mechanism is disposed downstream of these circuit areas, it is possible to cool both the high-voltage ground circuit area and the low-voltage ground circuit area with the low-temperature refrigerant gas taken in through the refrigerant suction port. Accordingly, it is possible to improve the heat-resistance reliability of the inverter unit.

The vehicle-air-conditioner electric compressor of the present invention may be configured such that, in any one of the above-described vehicle-air-conditioner electric compressors, the high-voltage cable and the low-voltage cable and the connector can each be led out in a direction either parallel or perpendicular to the motor axis direction of the electric motor.

In this configuration, because the high-voltage cable and the low-voltage cable and the connector can be led out in a direction either parallel or perpendicular to the motor axis direction of the electric motor, lead-out directions of the high-voltage cable and the low-voltage cable and the connector can each be arbitrarily selected as the direction parallel or perpendicular to the motor axis direction according to the mounting condition on the vehicle. Accordingly, it is possible to flexibly respond to a change in the mounting condition when mounted on the vehicle, and the design flexibility can be increased.

According to the present invention, the high-voltage cable and the high-voltage component, and the low-voltage cable and the connector can be disposed with a sufficient distance therebetween. This can suppress propagation of electromagnetic noise from the high-voltage system to the low-voltage system and assuredly prevent malfunctions or the like due to electromagnetic noise interference in the inverter unit. Accordingly, it is possible to improve the reliability of the inverter-integrated vehicle-air-conditioner electric compressor.

EXPLANATION OF REFERENCE SIGNS

1: vehicle-air-conditioner electric compressor
2: housing
3: motor housing
4: compressor housing
6: refrigerant suction port
7: discharge port
9: electric motor
9B: refrigerant circulation path
10: motor shaft
11: inverter box
13, 14: high-voltage cable
15, 16: low-voltage cable with connector
20: inverter unit
23: capacitor 24: inductor
27: power board
28: CPU board (microcomputer board)
29: DC-DC converter
30: communication circuit
31: motor-controlling microcomputer
32: other control circuit
HV: high-voltage ground circuit area
LV: low-voltage ground circuit area
L: motor axis direction

BEST MODE FOR CARRYING OUT THE INVENTION

Embodiments of the present invention will be described below with reference to the drawings.

First Embodiment

A first embodiment of the present invention will be described below with reference to FIGS. 1 to 5.

Figure 1:
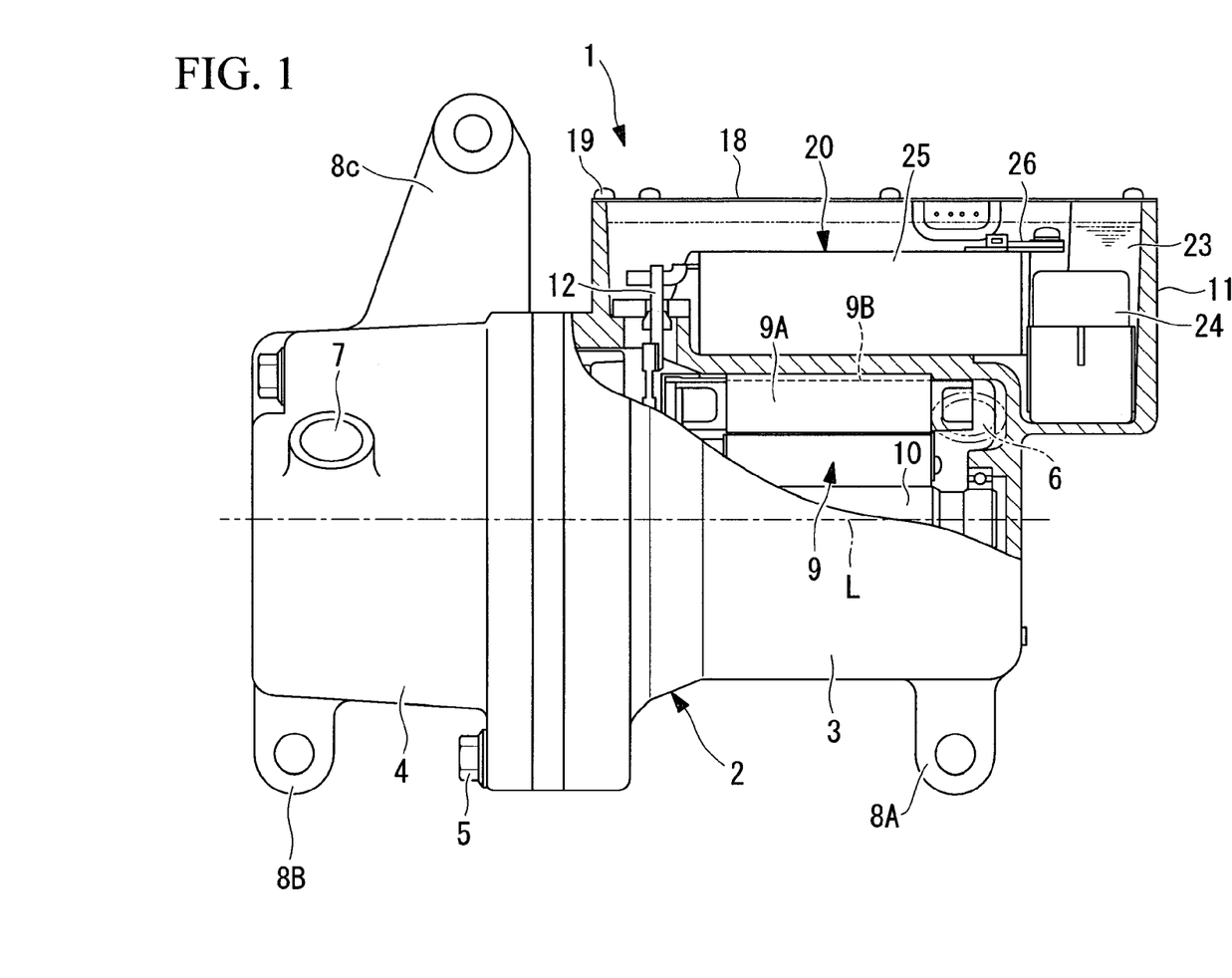
FIG. 1 is a partial vertical cross-sectional view showing an inverter box portion of a vehicle-air-conditioner electric compressor according to a first embodiment of the present invention, illustrated in a cutaway manner.

FIG. 1 is a partial vertical cross-sectional view showing an inverter box portion of a vehicle-air-conditioner electric compressor according to this embodiment, illustrated in a cut-away manner. A vehicle-air-conditioner electric compressor 1 has a housing 2 constituting a casing thereof. The housing 2 is formed of a motor housing 3 accommodating an electric motor 9 and a compressor housing 4 accommodating a compression mechanism (not shown) fastened together with a bolt 5. The motor housing 3 and the compressor housing 4 are made of die-cast aluminum.

The electric motor 9 accommodated in the housing 2 and the compression mechanism (not shown) are connected by a motor shaft 10, and the compression mechanism is configured to be driven by the rotation of the electric motor 9. The motor housing 3 has a refrigerant suction port 6 at one end (the right side in FIG. 1). Low-temperature, low-pressure refrigerant gas taken into the motor housing 3 from the refrigerant suction port 6 is flowed through a plurality of refrigerant circulation paths 9B provided on the periphery of a stator 9A of the electric motor 9, along a motor axis L, and at an appropriate distance from one another on the circumference, and is then taken into the compression mechanism to be compressed. It is arranged such that high-temperature, high-pressure refrigerant gas compressed by the compression mechanism is discharged into the compressor housing 4 and then sent outside through a discharge port 7 provided at one end of the compressor housing 4 (the left side in FIG. 1).

The housing 2 has, in total, three mounting legs 8A, 8B, and 8C: two on the lower portion at one end (the right side in FIG. 1) of the motor housing 3 and on the lower portion at one end (the left side in FIG. 1) of the compressor housing 4; and one on the upper side of the compressor housing 4. The vehicle-air-conditioner electric compressor 1 is mounted by fixing the mounting legs 8A, 8B, and 8C to a sidewall or the like of the drive motor installed in the engine compartment of a vehicle, with brackets and bolts. Typically, the inverter-integrated electric compressor 1 is cantilever-supported at three points on the upper and lower sides with fixing brackets, such that the motor axis L direction is aligned with the front-rear direction or the left-right direction of the vehicle.

Figure 2:
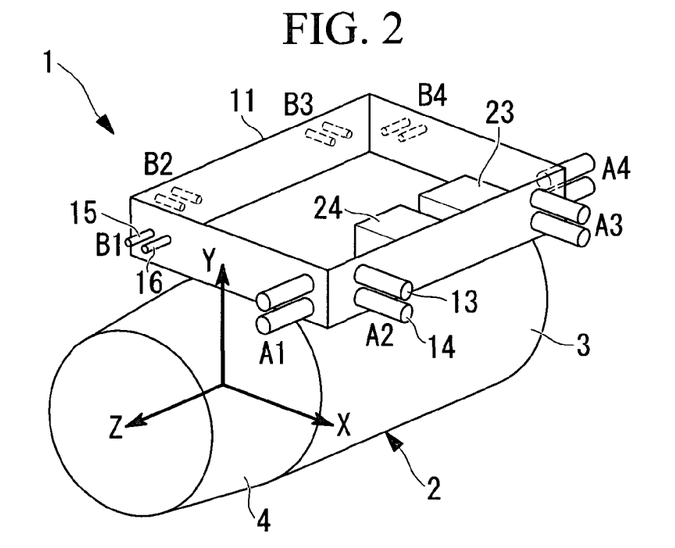
FIG. 2 is a perspective view showing a positional relationship between low-voltage cables and high-voltage cables and components of an inverter unit of the vehicle-air-conditioner electric compressor shown in FIG. 1.
Figure 3:
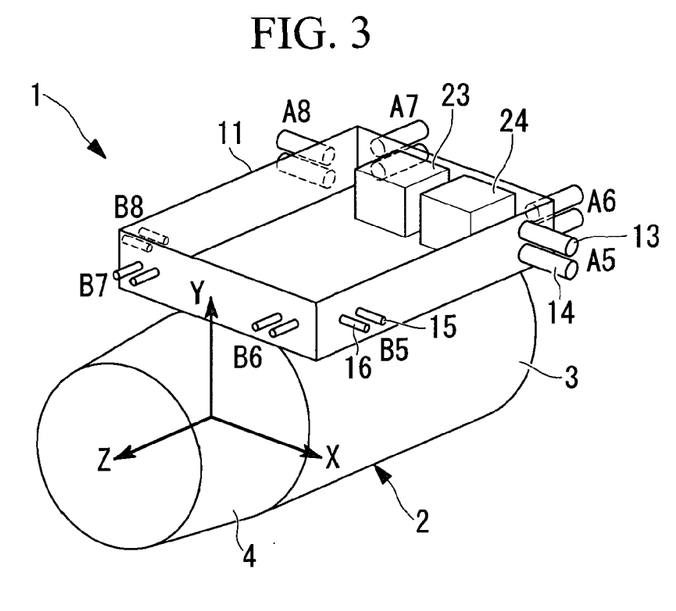
FIG. 3 is a perspective view of a modification, showing a positional relationship between low-voltage cables and high-voltage cables and components of the inverter unit of the vehicle-air-conditioner electric compressor shown in FIG. 1.

At the outer periphery of the motor housing 3, a substantially square-shaped inverter box 11 is formed integrally with the upper portion thereof. FIG. 1 is a partial vertical cross-sectional view of the inverter box 11, illustrated in a cutaway manner. As shown in FIGS. 1 to 3, the inverter box 11 has an open-top box structure enclosed by surrounding walls having a predetermined height, and the top opening is sealed shut by a cover member 18 fixed thereto with screws 19 or the like, with a sealing material (not shown) therebetween. The inverter box 11 accommodates an inverter unit 20 that converts direct-current power from a high-voltage power supply into three-phase alternating-current power to supply the electric motor 9 with the power via a glass sealing terminal 12.

The inverter unit 20 installed in the inverter box 11 has P-N terminals 21 and 22 (refer to FIG. 5) to which two high-voltage cables 13 and 14 (refer to FIGS. 2 and 3), leading to the high-voltage power supply, are connected, high-voltage components such as a capacitor 23 and an inductor 24 connected to a high-voltage line, an inverter module 25 serving as the central component of the inverter unit 20, a bus bar assembly 26 formed of a plurality of bus bars, serving as the electrical wiring in the inverter unit 20, integrated via insert molding using an insulating resin material, and the like. Japanese Patent Application No. 2007-055211, filed by the present inventor, is suitable for application to the inverter unit 20.

Figure 5:
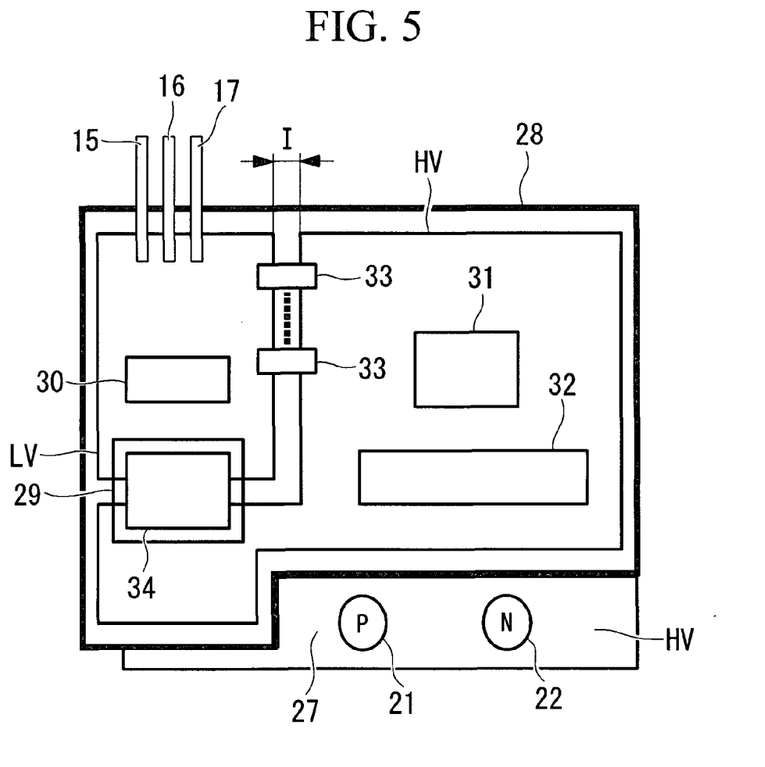
FIG. 5 is a plan view showing a board layout pattern of the inverter unit of the vehicle-air-conditioner electric compressor shown in FIG. 1.

The schematic configuration of the inverter unit 20 will be described with reference to FIG. 5.

The inverter module 25 is a modularized assembly of a power board 27 on which are mounted a plurality of (six) power semiconductor switching elements (power elements such as IGBTs) provided between an upper arm and a lower arm of the high-voltage line leading to the P-N terminals 21 and 22, a gate drive circuit for operating these power semiconductor switching elements, and the like; and a CPU board (microcomputer board) 28 on which are mounted an isolated DC-DC converter 29, a communication circuit 30, a motor-controlling microcomputer 31, other control circuit 32, and the like.

The CPU board 28 is divided into a high-voltage ground circuit area HV on which the motor-controlling microcomputer 31, the other control circuit 32, etc. are mounted and a low-voltage ground circuit area LV on which the communication circuit 30, etc. are mounted. The high-voltage ground circuit area HV and the low-voltage ground circuit area LV are delimited with an insulating distance I therebetween. The control systems, etc. of these circuit areas HV and LV are connected to each other through an isolated communication connector, such as a photocoupler 33 or an isolating transformer 34. The entirety of the power board 27 serves as the high-voltage ground circuit area HV.

The high-voltage cables 13 and 14 (refer to FIGS. 2 and 3) leading to the high-voltage power supply are connected to the switching elements on the power board 27 through the P-N terminals 21 and 22. The communication circuit 30 provided on the low-voltage ground circuit area LV of the CPU board 28 is configured to be supplied with a low voltage through low-voltage cables and connectors 15 and 16 (refer to FIGS. 2, 3, and 5) leading to a low-voltage power supply such as a vehicular battery power supply, and a control signal is sent thereto from a higher-level control unit through a communication cable and a connector 17 (refer to FIG. 5). The communication circuit 30, the motor-controlling microcomputer 31, the other control circuit 32, etc. mounted on the CPU board 28 are configured to operate on a low voltage supplied through the low-voltage cables and connectors 15 and 16 via the isolated DC-DC converter 29.

The arrangement configuration of the high-voltage cables 13 and 14, the high-voltage components, i.e., the capacitor 23 and the inductor 24, the low-voltage cables and connectors 15 and 16 are described with reference to FIGS. 2 and 3.

The inverter box 11 is, as mentioned above, substantially square-shaped. FIG. 2 shows an arrangement example in which the inverter box 11 accommodates the inverter unit 20 whose inverter module 25 has the circuit area HV and the circuit area LV disposed on the positive side and the negative side in the X-axis direction. In this arrangement, the high-voltage components, i.e., the capacitor 23 and the inductor 24, are disposed along the side surface on the positive side in the X-axis direction of the inverter box 11. The high-voltage cables 13 and 14 can be located at any position ranging from one end A1 at the side surface on the positive side in the Z-axis direction of the inverter box 11, the range from A2 to A3 at the side surface on the positive side in the X-axis direction, to one end A4 at the side surface on the negative side in the Z-axis direction, and can be led out therefrom.

In this case, the low-voltage cables and connectors 15 and 16 can be located at any position ranging from the other end B1 at the side surface on the positive side in the Z-axis direction of the inverter box 11, the range from B2 to B3 at the side surface on the negative side in the X-axis direction, to the other end B4 at the side surface on the negative side in the Z-axis direction, and can be led out therefrom. By disposing the high-voltage cables 13 and 14, the capacitor 23, and the inductor 24 of the high-voltage system, and the low-voltage cables and connectors 15 and 16 of the low-voltage system at the above-described locations, these cables and components can be sufficiently separated from each other.

FIG. 3 shows an arrangement example in which the inverter box 11 accommodates the inverter unit 20 whose inverter module 25 has the circuit area HV and the circuit area LV disposed on the positive side and the negative side in the Z-axis direction. In this arrangement, the high-voltage components, i.e., the capacitor 23 and the inductor 24, are disposed along the side surface on the negative side in the Z-axis direction of the inverter box 11. The high-voltage cables 13 and 14 can be located at any position ranging from one end A5 at the side surface on the positive side in the X-axis direction of the inverter box 11, the range from A6 to A7 at the side surface on the negative side in the Z-axis direction, to one end A8 at the side surface on the negative side in the X-axis direction, and can be led out therefrom.

Furthermore, in this case, the low-voltage cables and connectors 15 and 16 can be located at any position ranging from the other end B5 at the side surface on the positive side in the X-axis direction of the inverter box 11, the range from B6 to B7 at the side surface on the positive side in the Z-axis direction, and the other end B8 at the side surface on the negative side in the X-axis direction, and can be led out therefrom. Also by disposing the high-voltage cables 13 and 14, the capacitor 23, and the inductor 24 of the high-voltage system, and the low-voltage cables and connectors 15 and 16 of the low-voltage system at the above-described locations, these cables and components can be sufficiently separated from each other.

In other words, as shown in FIGS. 2 and 3, the inverter box 11 accommodating the inverter unit 20 is configured such that lead-out positions of the low-voltage cables and connectors 15 and 16 for supplying a low voltage from the low-voltage power supply to the isolated DC-DC converter 29 and the communication circuit 30 provided on the low-voltage ground circuit area LV are provided either in the side surface opposite to the mounting position of the high-voltage components (the capacitor 23 and the inductor 24) and the high-voltage cables 13 and 14 for supplying a high voltage from the high-voltage power supply to the power system circuit (the switching elements, etc.) provided on the high-voltage ground circuit area HV; or at an end farthest away from the mounting position of the high-voltage cables 13 and 14 and the high-voltage components 23 and 24 in an adjacent side surface or the same side surface.

Figure 4:
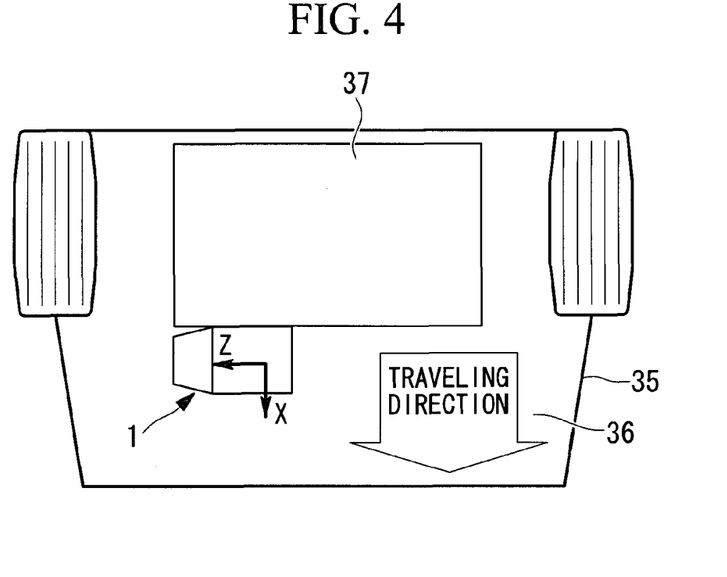
FIG. 4 is a schematic plan view of the vehicle-air-conditioner electric compressor shown in FIG. 1, mounted on a vehicle.

FIG. 4 shows an example of mounting of the vehicle-air-conditioner electric compressor 1 on a structure 37, such as an engine, installed in an engine compartment 36 of a vehicle 35. In this example, the vehicle-air-conditioner electric compressor 1 is mounted in such a manner that the motor axis L direction (Z-axis direction) is aligned with the left-right direction of the vehicle 35. Typically, the vehicle-air-conditioner electric compressor 1 is mounted in this manner or in a manner that the motor axis L direction (Z-axis direction) is aligned with the front-rear direction of the vehicle 35. With the mounting orientation of this example, the cables and connectors are normally led out from the side surface in the vehicle's traveling direction in the X-axis direction (positive direction) or in the Z-axis direction (positive or negative direction). When the cables and connectors are to be led out from the side surface adjacent to the structure 37, they have to be led out in the positive or negative Z-axis direction shown in FIGS. 2 and 3. In particular, because the high-voltage cables 13 and 14 have a large cable diameter and cannot be bent, it is very difficult to lead out these cables in the negative X-axis direction. Accordingly, a configuration in which various arrangements are designed and the lead-out directions of the cables and connectors can be selected from various choices is effective when mounted on a vehicle, and the design flexibility can be increased.

The above-described configuration according to this embodiment provides the following advantages.

In the inverter unit 20 accommodated in the inverter box 11, the power elements such as the IGBTs on the power board 27 are supplied with high-voltage direct-current power from the high-voltage cables 13 and 14 leading to the high-voltage power supply via the P-N terminals 21 and 22 and the high-voltage components, i.e., the capacitor 23, the inductor 24, etc. The direct-current power is converted into three-phase alternating-current power having a predetermined frequency by a switching operation of the power elements controlled by the gate drive circuit and is supplied to the electric motor 9 via the glass sealing terminal 12 to drive the electric compressor 1 at a rotational speed according to the air-conditioning load.

On the other hand, the isolated DC-DC converter 29 and the communication circuit 30 provided on the low-voltage ground circuit area LV and the motor-controlling microcomputer 31 and the other control circuit 32 provided on the high-voltage ground circuit area HV on the CPU board (microcomputer board) 28 of the inverter unit 20 are separately supplied with a low voltage from the provided low-voltage power supply through the low-voltage cables 15 and 16, and these circuits are operated on a low voltage and control the inverter unit 20 according to a control signal transmitted from the higher-level control unit to the communication circuit 30 through the communication cable 17.

Here, the inverter unit 20 is configured such that the high-voltage ground circuit area HV for driving the electric motor 9 and the low-voltage ground circuit area LV for control and communication are isolated from each other. The lead-out positions of the low-voltage cables and connectors 15 and 16 for supplying a low voltage from the low-voltage power supply to the circuit and components on the low-voltage ground LV are provided either in the side surface opposite to the mounting position of the high-voltage components 23 and 24 and the high-voltage cables 13 and 14 for supplying a high voltage from the high-voltage power supply to the power system circuit on the high-voltage ground; or at an end farthest away from the mounting position of the high-voltage cables 13 and 14 and the high-voltage components 23 and 24 in an adjacent side surface or the same side surface.

That is, because the lead-out positions of the low-voltage cables and connectors 15 and 16 (B1 to B4, and B5 to B8 in FIGS. 2 and 3) are provided either in the side surface opposite to the mounting position of the high-voltage cables 13 and 14 (B2 and B3, and B6 and B7) for supplying a high voltage and the high-voltage components 23 and 24 (A1 to A4, and A5 to A8 in FIGS. 2 and 3); or at an end farthest away from the mounting position of the high-voltage cables 13 and 14 and the high-voltage components 23 and 24 in an adjacent side surface or the same side surface (B1, B4, B5, and B8), the high-voltage cables 13 and 14 and the high-voltage components 23 and 24, as well as the low-voltage cables and connectors 15 and 16, can be disposed at positions sufficiently distant from each other. This can suppress propagation of the electromagnetic noise from the high-voltage system to the low-voltage system and can eliminate malfunctions or the like due to electromagnetic noise interference in the inverter unit 20. Thus, it is possible to improve the reliability of the vehicle-air-conditioner electric compressor 1.

To provide the high-voltage cables 13 and 14 and the high-voltage components 23 and 24 and the lead-out positions of the low-voltage cables and connectors 15 and 16 at the above-described positions, they have to be provided in two or more side surfaces of the inverter box 11 accommodating the inverter unit 20. Because the high-voltage ground circuit area HV and the low-voltage ground circuit area LV are provided bordering at least two adjacent side surfaces of the substantially square-shaped inverter box 11 accommodating the inverter unit 20, the lead-out positions of the high-voltage cables 13 and 14 and the lead-out positions of the low-voltage cables and connectors 15 and 16 can each be provided at a suitable position selected from two or more side surfaces. Accordingly, it is possible to flexibly respond to a change in the mounting condition when mounted on a vehicle.

Furthermore, because the high-voltage cables 13 and 14 and the low-voltage cables and connectors 15 and 16 can be led out in a direction either parallel or perpendicular to the motor axis L direction (Z-axis direction) of the electric motor 9, the lead-out direction of the high-voltage cables 13 and 14 and the lead-out direction of the low-voltage cables and connectors 15 and 16 can each be arbitrarily selected as the direction parallel or perpendicular to the motor axis L direction (Z-axis direction) according to the mounting condition on the vehicle 35. Accordingly, it is possible to flexibly respond to a change in the mounting condition when mounted on the vehicle 35, and the design flexibility can be increased.

Second Embodiment

A second embodiment of the present invention will be described with reference to FIG. 6.

This embodiment is different from the above-described first embodiment in that the board layout pattern of the inverter unit 20 and the arrangement configuration of the circulation paths of the refrigerant for cooling the inverter unit 20 are specified. Because the other features are the same as those in the first embodiment, an explanation thereof will be omitted.

The inverter unit 20 is provided with heat-generating components such as the capacitor 23, the inductor 24, and the power semiconductor switching elements (the power elements such as the IGBTs), which need to be cooled efficiently. FIG. 6 shows the board layout pattern of the inverter unit 20 and the positional relationship between the refrigerant suction port 6 and the refrigerant circulation paths 9B provided in the housing 2 (the motor housing 3).

Figure 6:
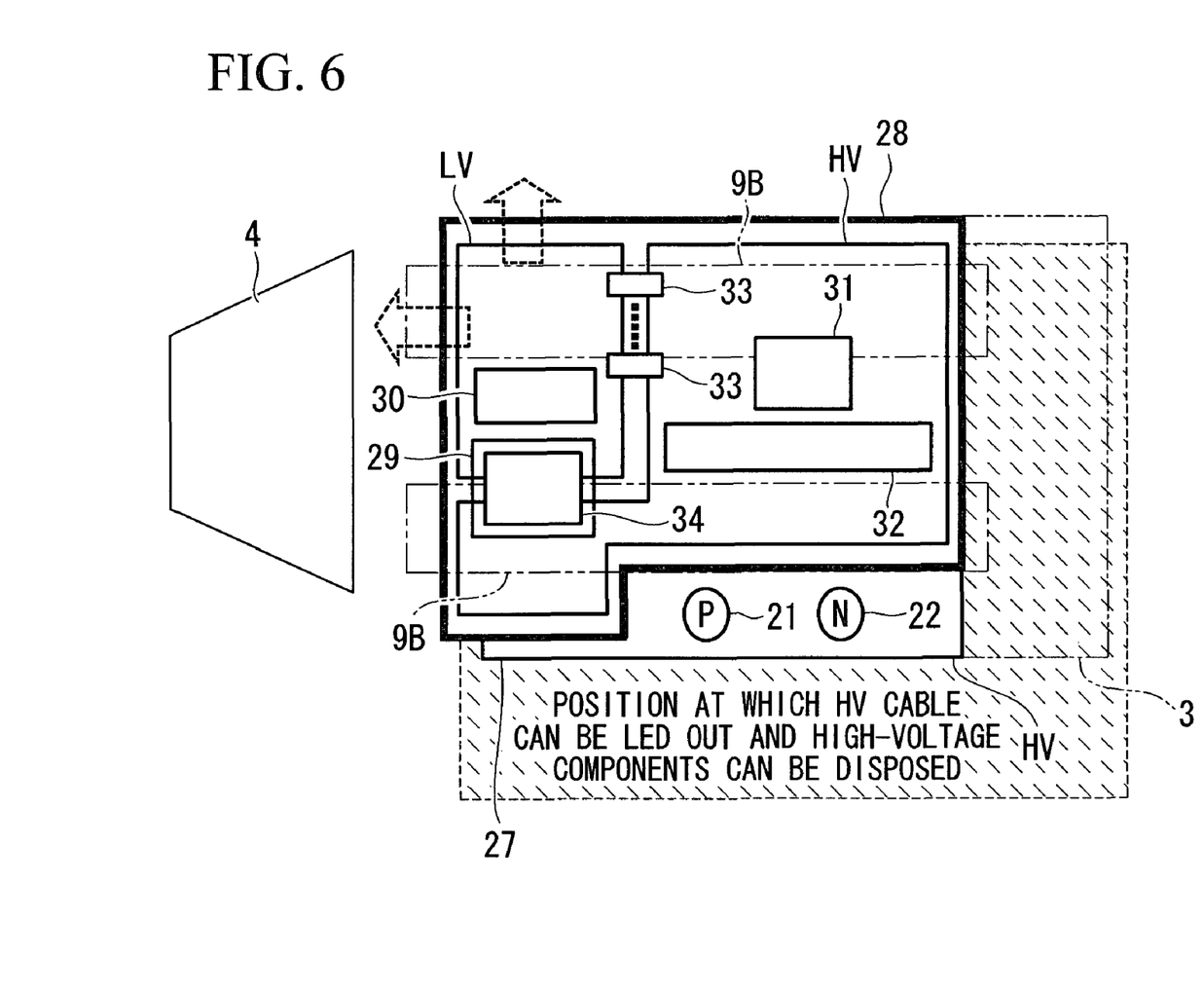
FIG. 6 is a plan view showing a positional relationship between a board layout pattern and a refrigerant circulation path of an inverter unit of a vehicle-air-conditioner electric compressor according to a second embodiment of the present invention.

The motor housing 3 has the refrigerant suction port 6 at one end (the right end in FIG. 6). Low-temperature, low-pressure refrigerant gas taken therethrough into the motor housing 3 flows in the refrigerant circulation paths 9B, formed on the periphery of the stator 9A of the electric motor 9 along the motor axis L direction, towards the compressor housing 4. In order that the heat-generating components of the inverter unit 20 accommodated in the inverter box 11 integrated with the periphery of the motor housing 3 can be efficiently cooled with the low-temperature refrigerant gas through the housing wall during this time, the layout patterns of the power board 27 and the CPU board 28 are set as follows.

In this embodiment, as shown in FIG. 6, the high-voltage ground circuit areas HV on the power board 27 and on the CPU board (microcomputer board) 28 are disposed upstream in the refrigerant flow direction in the refrigerant circulation paths 9B, and the low-voltage ground circuit area LV is disposed downstream thereof, at a corner of the CPU board 28. This enables the high-voltage ground circuit areas HV to be disposed at a position closer to the refrigerant suction port 6 with respect to the refrigerant circulation paths 9B. Thus, the high-voltage ground circuit area HV, on which the power board 27 having the high-voltage components, such as the capacitor 23 and the inductor 24, and the power elements, such as the IGBTs, that generate a large amount of heat is disposed, can be cooled with the refrigerant taken in from the refrigerant suction port 6, which is at the lowest temperature before being flowed in the electric motor 9. Thus, it is possible to cool the entirety of the inverter unit 20 efficiently and improve the heat-resistance reliability thereof.

In addition, because the high-voltage ground circuit areas HV on the power board 27 and on the CPU board (microcomputer board) 28 are provided such that they each border three adjacent side surfaces of the inverter box 11 and the low-voltage ground circuit area LV is provided such that it borders two adjacent side surfaces of the inverter box 11, the high-voltage cables 13 and 14 and the high-voltage components 23 and 24, as well as the low-voltage cables and connectors 15 and 16, can each be provided in any side surface selected from these side surfaces, with a sufficient distance therebetween. This can eliminate malfunctions or the like due to electromagnetic noise interference in the inverter unit 20. In addition, the lead-out directions of the high-voltage cables 13 and 14 and the low-voltage cables and connectors 15 and 16 can each be arbitrarily selected as the direction parallel or perpendicular to the motor axis L direction (Z-axis direction) according to the mounting condition on the vehicle 35. Accordingly, it is possible to flexibly respond to a change in the mounting condition when mounted on the vehicle 35.

Third Embodiment

A third embodiment of the present invention will be described with reference to FIG. 7.

This embodiment is different from the above-described first and second embodiments in the board layout pattern of the inverter unit 20. Because the other features are the same as those in the first and second embodiments, an explanation thereof will be omitted.

Figure 7:
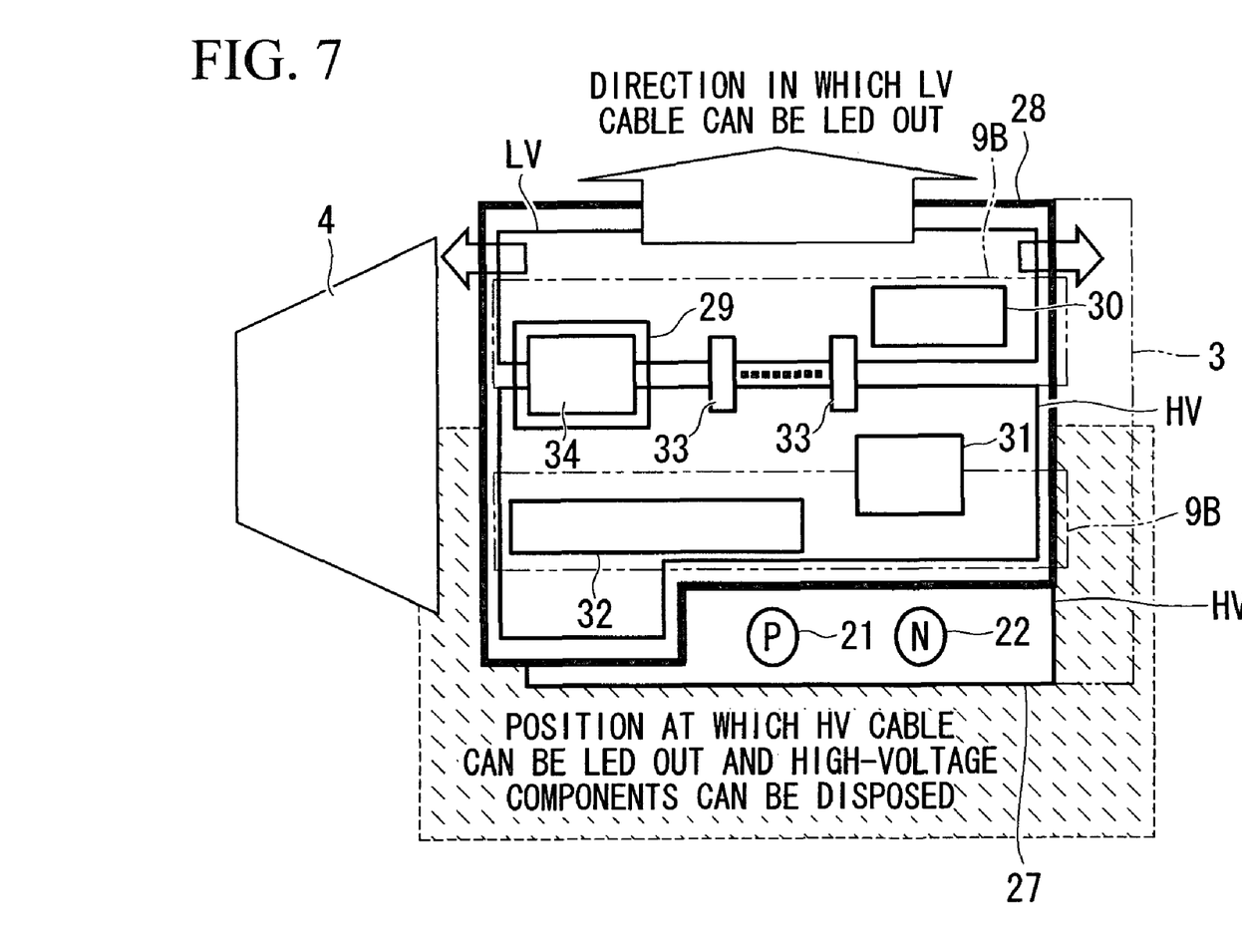
FIG. 7 is a plan view showing a positional relationship between a board layout pattern and a refrigerant circulation path of an inverter unit of a vehicle-air-conditioner electric compressor according to a third embodiment of the present invention.

As shown in FIG. 7, this embodiment is configured such that the high-voltage ground circuit areas HV provided on the power board 27 and on the CPU board 28 of the inverter unit 20 and the low-voltage ground circuit area LV are disposed parallel to each other in the flow direction of the refrigerant flowing in the refrigerant circulation paths 9B, and the compressor housing 4 accommodating the compression mechanism is disposed downstream of these circuit areas HV and LV.

As described above, by adopting a configuration in which the high-voltage ground circuit areas HV and the low-voltage ground circuit area LV are disposed parallel to each other in the flow direction of the refrigerant flowing in the refrigerant circulation paths 9B and in which the compression mechanism is disposed downstream of these circuit areas HV and LV, both the high-voltage ground circuit areas HV where the heat-generating components and the power board are disposed and the low-voltage ground circuit area LV can be cooled with the low-temperature refrigerant gas taken in through the refrigerant suction port 6. Thus, it is possible to cool the inverter unit 20 efficiently and improve the heat-resistance reliability thereof.

In addition, because the high-voltage ground circuit areas HV on the power board 27 and on the CPU board (microcomputer board) 28 are provided such that they each border three adjacent side surfaces of the inverter box 11 and the low-voltage ground circuit area LV is provided such that it borders three adjacent side surfaces of the inverter box 11, the high-voltage cables 13 and 14 and the high-voltage components 23 and 24, as well as the low-voltage cables and connectors 15 and 16, can each be provided in any side surface selected from these side surfaces, with a sufficient distance therebetween. This can eliminate malfunctions or the like due to electromagnetic noise interference in the inverter unit 20. In addition, the lead-out directions of the high-voltage cables 13 and 14 and the low-voltage cables and connectors 15 and 16 can each be arbitrarily selected as the direction parallel or perpendicular to the motor axis L direction (Z-axis direction) according to the mounting condition on the vehicle 35. Accordingly, it is possible to flexibly respond to a change in the mounting condition when mounted on the vehicle 35.

Fourth Embodiment

A fourth embodiment of the present invention will be described with reference to FIG. 8.

This embodiment is different from the above-described first to third embodiments in the board layout pattern of the inverter unit 20. Because the other features are the same as those in the first to third embodiments, an explanation thereof will be omitted.

Figure 8:
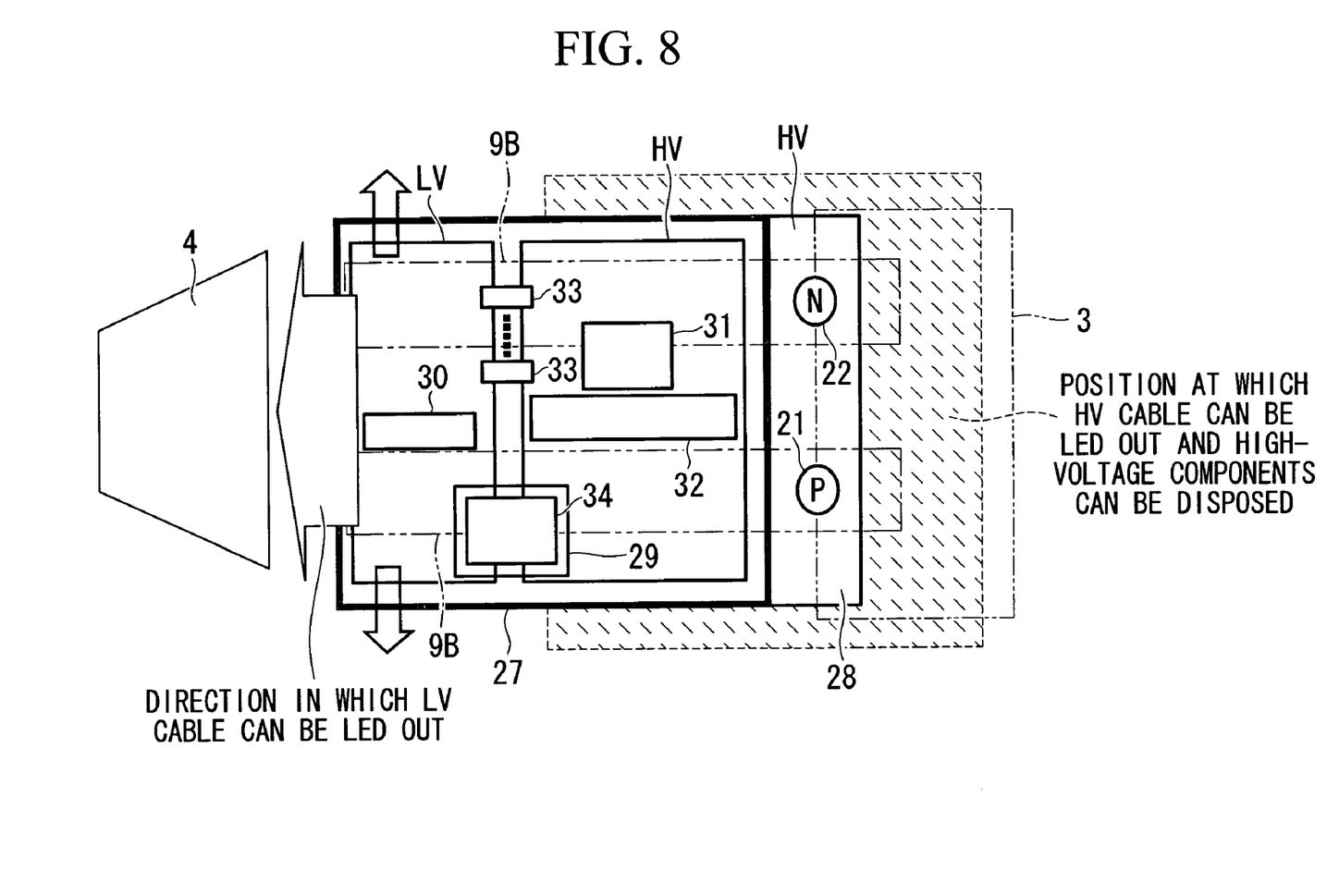
FIG. 8 is a plan view showing a positional relationship between a board layout pattern and a refrigerant circulation path of an inverter unit of a vehicle-air-conditioner electric compressor according to a fourth embodiment of the present invention.

As shown in FIG. 8, this embodiment is configured such that the high-voltage ground circuit areas HV are disposed upstream in the flow direction of the refrigerant flowing in the refrigerant circulation paths 9B, the low-voltage ground circuit area LV is disposed downstream thereof, and the compressor housing 4 accommodating the compression mechanism is disposed downstream of these circuit areas HV and LV.

By adopting a configuration in which the high-voltage ground circuit areas HV are disposed upstream in the flow direction of the refrigerant flowing in the refrigerant circulation paths 9B, the low-voltage ground circuit area LV is disposed downstream thereof, and the compression mechanism is disposed downstream of these circuit areas HV and LV, the high-voltage ground circuit area HV, on which the components that generate a large amount of heat are disposed, can be cooled with the refrigerant taken in from the refrigerant suction port 6, which is at the lowest temperature, in preference to the low-voltage ground circuit area LV. Thus, it is possible to cool the inverter unit 20 efficiently and improve the heat-resistance reliability thereof.

Also in this embodiment, because the high-voltage ground circuit areas HV on the power board 27 and on the CPU board (microcomputer board) 28 and the low-voltage ground circuit area LV are provided such that they each border three adjacent side surfaces of the inverter box 11, similarly to the above-described third embodiment, the high-voltage cables 13 and 14 and the high-voltage components 23 and 24, as well as the low-voltage cables and connectors 15 and 16, can be disposed with a sufficient distance therebetween, and the lead-out directions of the high-voltage cables 13 and 14 and the low-voltage cables and connectors 15 and 16 can each be arbitrarily selected as the direction parallel or perpendicular to the motor axis L direction (Z-axis direction) according to the mounting condition on the vehicle 35. This can eliminate malfunctions or the like due to electromagnetic noise interference in the inverter unit 20, and it is possible to flexibly respond to a change in the mounting condition when mounted on the vehicle 35.

The present invention is not limited to the invention according to the above-described embodiments and can be modified so long as it does not depart from the gist thereof. For example, the compression mechanism provided in the compressor housing 4 is not specifically limited and may be of any type, including a rotary type, scroll type, and swash plate type. The inverter box 11 does not necessarily have to be formed integrally with the motor housing 3, and it may be formed separately and then integrated with the motor housing 3.

In addition, the inverter unit 20 does not necessarily have to be the inverter module 25 assembled of the power board 27 and the CPU board (microcomputer board) 28; and a configuration in which the power board 27 and CPU board (microcomputer board) 28 are separated is possible. In such a case, a configuration in which the heat-generating components on the power board 27 side are provided in contact with the bottom surface of the inverter box 11 and the CPU board 28 is provided thereon is possible. Even in such a configuration, by disposing the high-voltage ground circuit area HV, on which the power board 27 having the high-voltage components, such as the capacitor 23 and the inductor 24, and the power elements, such as the IGBTs, that generate a large amount of heat is provided, close to the refrigerant suction port 6, it is possible to perform efficient cooling with the low-temperature refrigerant gas. Because this can reduce the influence of heat on the overlying CPU board 28 that generates less heat, the heat-resistance reliability can be further improved. The present invention also includes such an embodiment.

The invention claimed is:

1. A vehicle-air-conditioner electric compressor in which an inverter unit is integrated with a housing accommodating an electric motor and a compression mechanism, the inverter unit being configured such that a high-voltage ground circuit area for driving the electric motor and a low-voltage ground circuit area for control and communication are isolated from each other, wherein a lead-out position of a low-voltage cable and a connector for supplying a low voltage from a low-voltage power supply to the low-voltage ground circuit is provided either in a side surface opposite to a mounting position of a high-voltage component and a high-voltage cable for supplying a high voltage from a high-voltage power supply to a power system circuit on the high-voltage ground; or at an end farthest away from the mounting position of the high-voltage cable and the high-voltage component in an adjacent side surface or the same side surface, wherein the mounting position of the high-voltage component is disposed only along a side surface in the high-voltage ground circuit area.

2. The vehicle-air-conditioner electric compressor according to claim 1,
wherein the inverter unit is accommodated in a substantially square-shaped inverter box integrated with a side where the electric motor is accommodated in the housing, and
wherein the high-voltage ground circuit area and the low-voltage ground circuit area are provided such that they each border at least two adjacent side surfaces of the inverter box.

3. The vehicle-air-conditioner electric compressor according to claim 1,
wherein a refrigerant circulation path, which takes low-pressure refrigerant gas into the housing from a refrigerant suction port provided at one end at the side where the electric motor is accommodated, which allows the refrigerant gas to flow around the electric motor towards the other end in a motor axis direction, which allows the compression mechanism to take the refrigerant gas therein to be compressed, and which sends out the refrigerant gas from one end at the side where the compression mechanism is provided, is formed in the housing, and
wherein the high-voltage ground circuit area is disposed at the side where the refrigerant suction port is provided with respect to the refrigerant circulation path.

4. The vehicle-air-conditioner electric compressor according to claim 3,
wherein the high-voltage ground circuit area is disposed upstream in a flow direction of the refrigerant flowing in the refrigerant circulation path, the low-voltage ground circuit area is disposed downstream thereof, and the compression mechanism is disposed downstream of these circuit areas.

5. The vehicle-air-conditioner electric compressor according to claim 3,
wherein the high-voltage ground circuit area and the low-voltage ground circuit area are disposed parallel to each other in the flow direction of the refrigerant flowing in the refrigerant circulation path, and the compression mechanism is disposed downstream of these circuit areas.

6. The vehicle-air-conditioner electric compressor according to claim 1,
wherein the high-voltage cable and the low-voltage cable and the connector can each be led out in a direction either parallel or perpendicular to the motor axis direction of the electric motor.

* * * * *